United States Patent Office 3,523,027
Patented Aug. 4, 1970

3,523,027
COLLAGEN CASINGS STRENGTHENED BY TREATMENT WITH THE DIALDEHYDE OF A POLYSACCHARIDE CONTAINING CARBOXYL GROUPS
David Neville Hall, Wollaston, Wellingborough, England, assignor to Lever Brothers Company, New York, N.Y., a corporation of Maine
No Drawing. Continuation of application Ser. No. 484,761, Sept. 2, 1965. This application Feb. 3, 1969, Ser. No. 800,339
Claims priority, application Great Britain, Sept. 8, 1964, 36,781/64
Int. Cl. A23j 1/10; A22c 13/100; C08h 7/06
U.S. Cl. 99—176                                 8 Claims

ABSTRACT OF THE DISCLOSURE

Collagen products, especially sausage casings, are strengthened by treatment with the dialdehyde of a polysaccharide containing carboxyl groups, e.g., alginic acid.

---

This application is a continuation of application Ser. No. 484,761, filed Sept. 2, 1965, and now abandoned.

This invention relates to the treatment of collagen and cold-water-insoluble collagen derivatives.

Collagen is commonly used in the preparation of artificial casing materials, for example sausage casings, but the manufacture of such products is frequently complicated by the frailty of the product when it is first precipitated. Thus, because of the probability of mechanical damage, conventionally produced artificial sausage casings usually cannot be handled until they have undergone some drying treatment whereby they are rendered less fragile. For convenience, in this specification products formed from collagen or from cold-water-insoluble collagen derivatives will be referred to as collagenous products. The treatment of cold-water-soluble compounds such as gelatine is excluded.

The invention provides a method of strengthening collagenous products which comprises treating the product with a polysaccharide derivative having repeated aldehydic groupings in its molecule. Preferably, the aldehyde has a molecular weight greater than about 1,000, more preferably greater than 2,000.

It is advantageous if the aldehyde is one in which there are electrophilic groups, for example carboxyl groups, so positioned in the molecule that they enhance the reactivity of the aldehyde groups. This is particularly preferable when the strengthening of the product has to be carried out under acid conditions or in the presence of a salt, as for example after extrusion of an acid collagenous dough into salt solution.

Preferably the aldehyde is derived from a polysaccharide comprising monosaccharide units with a pyranose configuration, and having an electrophilic group in the 6-position, in which at least one aldehyde group is obtained upon oxidation of a secondary alcohol group in a monosaccharide pyranose ring. Examples of suitable compounds for use according to the invention are water-soluble dialdehyde compounds such as dialdehyde alginic acid, dialdehyde gum arabic, dialdehyde pectic acid and dialdehyde gum tragacanth, and their salts where appropriate. When selecting the aldehyde to be employed the question of toxicity will, of course, be considered if the collagenous product is to be eaten.

The solubility of aldehyde might limit the range of conditions under which it can be employed with maximum effectiveness, and allowance should be made for such solubility limitations. For example, the effectiveness of dialdehyde alginic acid in saturated sodium chloride solution is not very high and it has been found convenient to employ this substance, when the collagenous product to be strengthened has been precipitated in sodium chloride, either in a separate solution containing a small amount of sodium chloride or in the form of a spray of the dialdehyde alginic acid in aqueous solution applied after removal of the collagenous product from the sodium chloride bath.

Conversion of the polysaccharide to the aldehyde is preferably brought about by periodic oxidation. It is conjectured that dialdehyde alginic acid obtained by periodic oxidation as described in Example 1 has the structure:

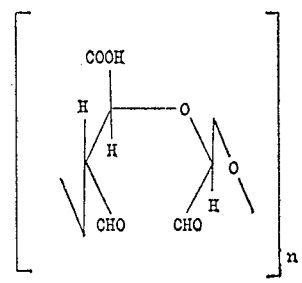

The strengthening effect of the aldehyde is related to the number of aldehyde groups it contains. For maximum effectiveness the degree of oxidation should be such that every pyranose ring in the polysaccharide molecule has its secondary alcohol groups oxidised to aldehyde, but in practice quite satisfactory results have been obtained with lower degrees of oxidation, for example 20% to 80% of the pyranose ring secondary alcohol groups oxidised to aldehyde.

The concentration of the solution of aldehyde employed can vary considerably within the limits imposed by solubility, but concentrations between 1% and 5%, particularly 2% to 3%, are preferred.

The strengthening process of the invention is also applicable to the treatment of collagenous casings formed in situ, for example, to strengthen sausage casings which have been formed on the sausage. During such a process the casing may be formed on the sausage while the sausage meat is being extruded, and the strengthening agent of the invention may be sprayed on or otherwise contacted with the casing.

The preparation of the aldehyde of a polysaccharide and its use as a hardening agent for a manufactured collagenous sausage casing are exemplified below.

EXAMPLE I

Preparation of dialdehyde alginic acid 20 gm. of alginic acid were dispersed in 400 ml. of water containing 30 gm. of iodic acid.

The dispersion was placed in a cell fitted with electrodes which allowed the iodic acid to be oxidized electrolytically to periodate using 6 amps for 8 hours. The formed periodate oxidized the alginic acid and was itself reduced again to iodic acid.

The resulting mixture was freed of insoluble material by centrifugation, and dialysed to remove inorganic ions and degradation products. The final solution was 2% polymeric aldehyde.

EXAMPLE II

Alternative preparation of dialdehyde alginic acid 18 gm. of alginic acid was dispersed in 500 ml. of water, containing 35 gm. of iodic acid. The mixture was electrolytically oxidised for 18 minutes with a current of 10 amps.

The solid dialdehyde alignic acid was collected and the iodic acid was recovered for further use. The solid aldehyde was solubilised by refluxing with 0.1 molar hydrochloric acid. The extent of oxidation was about 30% of the theoretical maximum.

EXAMPLE 3

(A) 5 kg. of limed collagen (splits from cattle hide) were immersed for an hour at room temperature in 20 litres of water containing 200 p.p.m. of free chlorine. The splits were then transferred to 20 litres of a 10% solution of sodium chloride. HCl was then added to pH 3.0. When the centre of a cut piece of split was acid to phenolphthalein, the acid washing was complete and the splits were washed in water until the centre of a split showed a neutral reaction.

The splits were then soaked in 20 litres of a saturated solution of sodium sulphate at 20° C. for 24 hours. Sodium hydroxide was then added to make the salt solution molar with respect to sodium hydroxide, that is 4%, and the splits were gently agitated in this bath for a further 28 hours at 20° C.

The treated splits were washed with water, then dilute HCl was added, but the pH was not allowed to fall below 3.0. The splits were again washed in water until the centre of a cut piece was neutral, and then minced by passing the splits once through a mincing machine fitted with a plate having 8 mm. holes. The minced collagen at this stage contained about 20% solids. The minced collagen was then comminuted by three passes through a colloid mill to give a paste having a creamy consistency. Water was added to reduce the collagen concentration to 6.0%.

The collagen was then thoroughly mixed in a planetary dough mixer while lactic acid was added to reduce the pH to 3.0. The dough so obtained was deaerated by mixing under vacuum in a Z blade mixer for 20 minutes.

The air-free dough, having a viscosity of 50 poise, was fed to a contra-rotating extrusion nozzle having an annular aperture of 0.5 mm. The indicated extrusion pressure employed for a dough containing 6% collagen was 11.2 kg./sq. cm., when extruded at 5 metres per minute. The formed casing was extruded upwards into an aqueous solution containing sodium chloride (saturated). Immediately after precipitation in the saturated sodium chloride solution the casing was withdrawn from the precipitation bath and sprayed with a 2% aqueous solution of dialdehyde alginic acid prepared as in Example I. The casing was inflated with air, and the sodium chloride/dialdehyde alginic acid solution was circulated in the interior of the tube.

The inflated casing, was dried in hot air until the moisture content was below 30%, when it was washed with water, redried in hot air, and allowed to equilibrate in at atmosphere at 80% relative humidity for 24 hours.

(B) A casing was prepared as described in (A) except that the dialdehyde alginic acid spray was omitted. The strengths of the casings measured as bursting strengths were as follows:

Dialdehyde alginic acid treated casing from (A)—1.5 kg.
Unstrengthened casing from (B)—0.8 kg.

What is claimed is:
1. A method of strengthening a hide collagenous casing product which comprises treating said product with a polysaccharide derivative selected from the group consisting of dialdehyde alginic acid, dialdehyde pectic acid, dialdehyde gum arabic, dialdehyde gum tragacanth and salts thereof.

2. The method according to claim 1 in which the polysaccharide derivative is applied to the hide collagenous product in an aqueous solution of a concentration between 1% and 5%.

3. The method according to claim 1 wherein the polysaccharide derivative is dialdehyde alginic acid.

4. A method of forming sausage casings which comprises the steps of (a) forming a dough from hide collagen, (b) extruding the dough into a precipitating bath to form a casing, (c) withdrawing the casing from the precipitating bath, (d) contacting at least one surface of the casing with an aqueous solution of dialdehyde alginic acid, (e) drying the casing in hot air to a moisture content below about 30%, (f) washing the casing in water, and (g) redrying the casing to a stable moisture content.

5. A strengthened hide collagenous product, said casing product having undergone a treatment by reaction with a polysaccharide derivative selected from the group consisting of dialdehyde alginic acid, dialdehyde pectic acid, dialdehyde gum arabic, dialdehyde gum tragacanth and salts thereof.

6. A product according to claim 5 wherein the polysaccharide is dialdehyde alginic acid.

7. A sausage casing comprising extruded hide collagenous casing strengthened by reaction with a polysaccharide derivative selected from the group consisting of dialdehyde alginic acid, dialdehyde pectic acid, dialdehyde gum arabic, dialdehyde gum tragacanth and salts thereof.

8. A sausage casing comprising extruded hide collagenous casing strengthened by reaction with dialdehyde alginic acid.

References Cited
UNITED STATES PATENTS

| | | | |
|---|---|---|---|
| 2,824,092 | 2/1958 | Thompson | 260—117 |
| 3,041,182 | 6/1962 | Hansen et al. | 99—169 |
| 3,093,439 | 6/1963 | Bothwell | 8—94.11 |

WILLIAM H. SHORT, Primary Examiner

H. SCHAIN, Assistant Examiner

U.S. Cl. X.R.

8—94.11; 106—155; 260—123.7; 264—202